US009239620B2

(12) United States Patent
Chang

(10) Patent No.: US 9,239,620 B2
(45) Date of Patent: Jan. 19, 2016

(54) WEARABLE DEVICE TO CONTROL EXTERNAL DEVICE AND METHOD THEREOF

(71) Applicant: Samsung Electronics Co., Ltd, Suwon-si, Gyeonggi-do (KR)

(72) Inventor: Jin-min Chang, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 91 days.

(21) Appl. No.: 14/081,059

(22) Filed: Nov. 15, 2013

(65) Prior Publication Data

US 2014/0132410 A1    May 15, 2014

(30) Foreign Application Priority Data

Nov. 15, 2012  (KR) .......................... 10-2012-0129813

(51) Int. Cl.
  *G08B 1/08* (2006.01)
  *G06F 3/01* (2006.01)
(52) U.S. Cl.
  CPC ..................................... *G06F 3/014* (2013.01)
(58) Field of Classification Search
  CPC ............... A63B 2024/0096; A63B 2071/0647; A63B 2220/05; A63B 2220/13; A63B 2220/40; A63B 2220/51; A63B 2220/58; A63B 2220/80; A63B 2220/805; A63B 2220/806; A63B 2220/833; A63B 2220/836; A63B 2225/20

USPC ............... 340/539.11, 539.1, 539.13–539.14, 340/691.6, 692, 825.24, 5.22, 7.54–7.55
See application file for complete search history.

(56) References Cited

U.S. PATENT DOCUMENTS

| 5,858,291 | A  | * | 1/1999 | Li et al. .......................... 264/105 |
| 5,881,384 | A  | * | 3/1999 | Williams .......................... 2/158 |
| 8,362,350 | B2 | * | 1/2013 | Kockovic ......................... 84/743 |
| 2011/0034300 | A1 | * | 2/2011 | Hall ................................. 482/1 |
| 2011/0193933 | A1 | * | 8/2011 | Ryu et al. .................... 348/14.08 |

FOREIGN PATENT DOCUMENTS

| JP | 05-341786 | 12/1993 |
| KR | 2008-0021201 | 3/2008 |
| KR | 2012-0080394 | 7/2012 |

* cited by examiner

*Primary Examiner* — Daniel Previl
(74) *Attorney, Agent, or Firm* — Staas & Halsey LLP

(57) ABSTRACT

A wearable device that is worn on a user body includes a motion sensor to recognize a motion of the wearable device, a bending sensor to sense bending of the wearable device, a controller to generate a control signal according to a movement that is sensed by the motion sensor and the bending sensor, a communication unit to transmit the control signal to an external device, and, when an audio reproducing operation is adjusted according to the control signal in the external device, to receive a result of the adjusting from the external device, and a display to display the result of the adjusting. Accordingly, a content of the external device is easily adjusted.

19 Claims, 13 Drawing Sheets

//WEARABLE DEVICE TO CONTROL EXTERNAL DEVICE AND METHOD THEREOF

CROSS-REFERENCE TO RELATED APPLICATIONS

This application claims priority under 35 U.S.C. §119(a) from Korean Patent Application No. 10-2012-0129813, filed on Nov. 15, 2012 in the Korean Intellectual Property Office, the disclosure of which is incorporated herein by reference in its entirety.

BACKGROUND OF THE INVENTION

1. Field of the Invention

Methods and apparatuses consistent with exemplary embodiments relate to a wearable device and a method of controlling an external device using the same, and more particularly, to a wearable device that senses a user's movement and controls an external device according to the movement, and a control method thereof.

2. Description of the Related Art

Advancements in electronic technologies have resulted in development of various types of electronic devices. As such, development of games, music, multimedia contents, and applications that can be used in various kinds of electronic devices has been accelerated.

In particular, users require enhancements in audio and video contents, as well as advanced editing and creating capabilities of various multimedia contents.

However, since a device to perform such functions is generally expensive and complicated to use, an average user has difficulty acquiring and using such an advanced device. Accordingly, there is a need for a more inexpensive and user-friendly multimedia creating and editing device.

SUMMARY OF THE INVENTION

The present general inventive concept provides a wearable device that can be worn by a user to allow the user to control an external device that processes contents easily, and a control method thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing a wearable device that is worn on a user body, the wearable device including a motion sensor to recognize a motion of the wearable device, a bending sensor to sense bending of the wearable device, a controller to generate a control signal according to a movement that is sensed by the motion sensor and the bending sensor, a communication unit to transmit the control signal to an external device, and, when an audio reproducing operation is adjusted according to the control signal in the external device, to receive a result of the adjusting from the external device, and a display to display the result of the adjusting.

The wearable device may be a device of a glove shape that includes a plurality of finger parts, and the bending sensor may be disposed in each of the plurality of finger parts and sense bending of each finger part. The result of the adjusting may include at least one of equalizing data that is generated according to an equalizing operation performed in the external device according to the control signal, audio data information that is reproduced in the external device, an audio output volume, and an audio reproducing time.

When an audio reproducing program is executed in the external device, the controller may activate the motion sensor and the bending sensor.

The wearable device may further include a storage to store a plurality of control codes. In this case, the controller may detect a control code corresponding to a sensing value sensed by the motion sensor and the bending sensor from the storage, and may generate a control signal including the detected control code.

The wearable device may further include a speaker to output an audio signal that is transmitted from the external device.

When it is determined that a predetermined end motion is generated, the controller may generate an end signal to finish adjusting audio data according to the control signal and to store the adjusted data, and may transmit the end signal to the external device.

The wearable device may include a body formed in the glove shape and which is made of flexible material, and supports the motion sensor, the bending sensor, the controller, the communication unit, and the display, and a power supply embedded in the body and which is made of flexible material, and supplies power to the motion sensor, the bending sensor, the controller, the communication unit, and the display, such that the display may be disposed on an outer surface of a back of a hand in the body.

The body may include a pair of a left-hand glove and a right-hand glove, and the motion sensor, the bending sensor, the controller, the communication unit, and the display may be disposed in each of the left-hand glove and the right-hand glove. The controller disposed in the left-hand glove may adjust an audio reproducing time of the external device according to a movement of the left-hand glove, and the controller disposed in the right-hand glove may control an equalizing operation of the external device according to a movement of the right-hand glove.

The foregoing and/or other features and utilities of the present general inventive concept may also be achieved by providing a method of controlling an external device of a wearable device that is worn on a body of a user, the method including: outputting, by a motion sensor and a bending sensor mounted in the wearable device, a sensing value according to a user's movement; generating a control signal according to the sensing value; transmitting the control signal to the external device, and, when an audio reproducing operation is adjusted according to the control signal by the external device, receiving a result of the adjusting from the external device; and displaying the result of the adjusting.

The wearable device may be a device of a glove shape that includes a plurality of finger parts, and the bending sensor may be disposed in each of the plurality of finger parts and may sense bending of each finger part, such that the result of the adjusting may include at least one of equalizing data that is generated according to an equalizing operation performed in the external device according to the control signal, audio data information that is reproduced in the external device, an audio output volume, and an audio reproducing time.

The method may further include, when an audio reproducing program is executed in the external device, activating the motion sensor and the bending sensor.

The generating the control signal may include detecting a control code corresponding to a sensing value sensed by the motion sensor and the bending sensor from among pre-stored control codes, and generating a control signal including the detected control code.

The method may further include outputting an audio signal that is transmitted from the external device through a speaker that is attached to the wearable device.

The method may further include, when it is determined that a predetermined end motion is generated, generating an end signal to finish adjusting audio data according to the control signal and to store the adjusted data, and transmitting the end signal to the external device.

The wearable device may include a pair of a left-hand glove and a right-hand glove, and the generating the control signal may include generating a first control signal to adjust an audio reproducing time of the external device according to a movement of the left-hand glove, and generating a second control signal to control an equalizing operation of the external device according to a movement of the right-hand glove.

The foregoing and/or other features and utilities of the present general inventive concept may also be achieved by providing a wearable device to be worn by a user and to communicate with an external device having content stored therein, the wearable device including a motion sensor to sense a movement of the wearable device, a bending sensor to sense bending of the wearable device, and a communication unit to transmit the sensed movement and the sensed bending to the external device via a control signal in order to manipulate the stored content within the external device based on the control signal.

The wearable device may further include a controller to generate the control signal according to the sensed movement and the sensed bending.

The wearable device may further include a display to display a result of the manipulation of the content in response to receiving the result of the manipulation from the external device through the communication unit.

The manipulation of the stored content may include at least one of adjusting an audio reproducing time of the content, adjusting a reproducing speed of the content, equalizing the content, adjusting a volume of the content, stopping reproduction of the content, resuming reproduction of the content, pausing reproduction of the content, and changing to another content.

The manipulation of the content may vary based on at least one of a speed of the movement and an intensity and degree of the bending.

The wearable device may further include a touch sensor to sense a touch pressure of the wearable device that is transferred to an object to generate another control signal to manipulate the stored content within the external device based on the another control signal.

The manipulation of the content may vary based on at least one of an intensity of the touch pressure and a frequency of the touch pressure.

The control signal corresponding to the sensed movement and the sensed bending may be disregarded when the touch pressure is sensed.

The communication between the wearable device and the external device may be performed wirelessly.

The foregoing and/or other features and utilities of the present general inventive concept may also be achieved by providing a wearable device to be worn by a user and to communicate with an external device, the wearable device including at least one sensor to sense a mode-switching manipulation of the wearable device while in a first operating mode during which a plurality of operations are executable in response to a first series of corresponding manipulations of the wearable device, and a communication unit to transmit the sensed mode-switching manipulation to the external device via a control signal in order to switch from the first operating mode to a second operating mode during which another plurality of operations are executable based on a second series of corresponding manipulations of the wearable device.

The mode-switching manipulation may include at least one of moving the wearable device, bending the wearable device, and applying pressure to the wearable device.

The first series of corresponding manipulations of the wearable device may be the same as the second series of corresponding manipulations of the wearable device.

The at least one sensor may include at least one of a motion sensor to sense a movement of the wearable device, a bending sensor to sense bending of the wearable device, and a touch sensor to sense a touch pressure of the wearable device that is transferred to an object.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
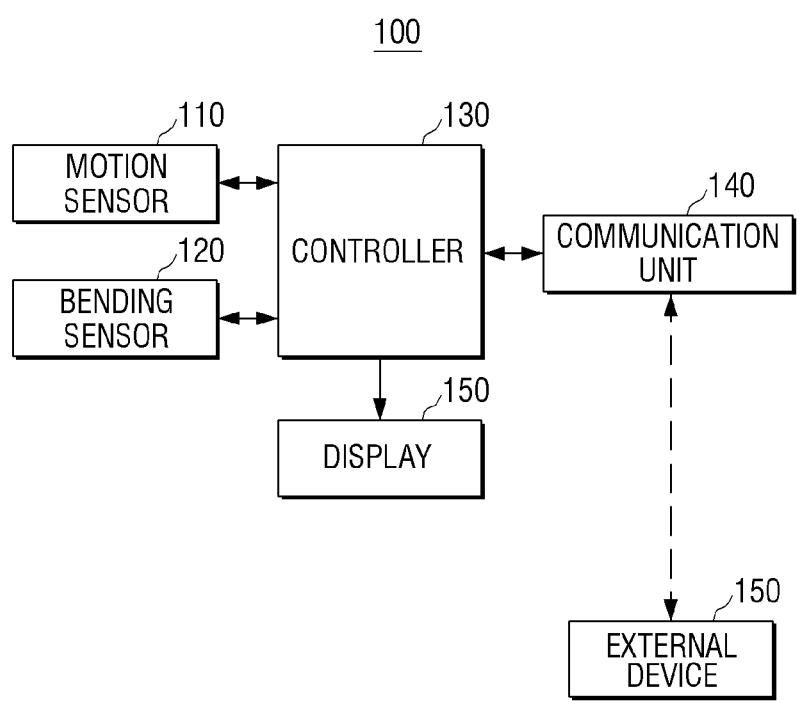
FIG. 1 is a block diagram illustrating a wearable device according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram illustrating a configuration of a wearable device 100 according to an exemplary embodiment of the present general inventive concept. The wearable device 100 refers to a device that is made of flexible material and can be worn by a user. For example, the wearable device 100 may be various kinds of devices that can be worn by human and animal on their bodies such as clothes, shoes, gloves, glasses, hats, and various accessories, but is not limited thereto. Although a wearable device implemented in a glove shape will be explained hereinafter, the wearable device is not limited to such a type and may be implemented in various shapes.

Referring to FIG. 1, the wearable device 100 includes a motion sensor 110, a bending sensor 120, a controller 130, a communication unit 140, and a display 150.

The motion sensor 110 is a sensor that recognizes a motion of the wearable device 100. Specifically, the motion sensor 110 may include at least one of a gyro sensor, a geomagnetic sensor, and an acceleration sensor. Accordingly, the motion sensor 110 outputs to the controller 130 a sensing value indicating in which direction the wearable device 100 is rotated and in which direction the wearable device 100 is moved. A detailed sensing method will be explained below.

The bending sensor 120 is a sensor that senses bending of the wearable device 100. The bending sensor 120 may be implemented by using a strain gage. Since the wearable device 100 is made of flexible material as described above, a user who wears the wearable device 100 may bend his/her body part on which the wearable device 10 is worn, such as a hand or fingers. The bending sensor 120 may output a sensing value corresponding to such bending to the controller 130.

The controller 130 senses a user's movement based on the sensing values of the motion sensor 110 and the bending sensor 120. The controller 130 generates a control signal according to the sensed movement. The control signal is a signal to control an operation of an external device 200 that is interlocked with and/or wirelessly connected to the wearable device 100. The control signal may be generated in various formats according to a communication method between the wearable device 100 and the external device 200. Specifically, the control signal may be generated according to a wireless communication standards such as Bluetooth, Zigbee, and WiFi, or may be generated in an infrared rays (IR) remote control signal format.

The communication unit 140 transmits the control signal generated by the controller 130 to the external device 200. The communication unit 140 may include various kinds of chips according to an exemplary embodiment of the present general inventive concept. For example, the communication unit 140 may include at least one of various kinds of chips such as a Wi-Fi chip, a Bluetooth chip, a near field communication (NFC) chip, and a wireless communication chip. When the communication unit 140 uses the Wi-Fi chip or the Bluetooth chip, the communication unit 140 may exchange a variety of connection information such as an SSID and a session key with the external device 200 and establish a communication connection first, and then, may exchange a variety of information or commands. The wireless communication chip is a chip that performs communications according to various communication standards such as IEEE, Zigbee, $3^{rd}$ Generation (3G), $3^{rd}$ Generation Partnership Project (3GPP), and long term evolution (LTE). The communication unit 140 may include an IR lamp. The communication unit 140 may transmit the control signal to the external device 200 using such various communicating means.

The external device 200 performs an operation corresponding to the control signal transmitted through the communication unit 140. Specifically, the external device 200 may be implemented by using various types of user terminal devices such as a mobile phone, a tablet PC, a laptop computer, a PC, a TV, a set-top box, and a kiosk. Such a user terminal device may selectively reproduce an audio or video content according to a reproduction command transmitted from the wearable device 100 or a reproduction command input through the user terminal device itself.

The controller 130 may transmit various control signals according to user's movements sensed by the motion sensor 110 and the bending sensor 120. For example, when a movement set to start reproducing a content is sensed, the controller 130 may control the communication unit 140 to transmit a reproduction command to the user terminal device. For example, when a movement to adjust a content reproducing time, a movement to perform equalizing, or a movement to adjust an output volume is sensed, the controller 130 may control the communication unit 140 to transmit a content reproducing time adjustment command, an equalizing command, or a volume adjustment command to the user terminal device according to the movement.

When the user terminal device adjusts a reproducing operation of a content according to the control signal, the user terminal device may transmit a result of the adjusting to the wearable device 100. The communication unit 140 receives such a result of the adjusting and notifies the controller 130 of it. The controller 130 may display the result of the adjusting through the display 150.

The display 150 may be implemented by using various display elements such as a light emitting diode (LED) array, a liquid crystal display (LCD) display or a touch panel. The display 150 may display a variety of information under the control of the controller 130. Specifically, when the external device 200 performs equalizing according to the control signal, the display 150 may display equalizing data that is generated according to the equalizing operation. Also, when information corresponding to a content that is being currently reproduced by the external device 200 is received, the display 150 may display the content information. Besides these, the display 150 may display an audio output volume or a content reproducing time.

For example, if a content is audio data, an audio reproducing time may be displayed through the display 150. When the user wears the wearable device 100 and makes a gesture as if he/she "scratches" a record like a disc jockey (DJ), the controller 130 transmits a control signal to adjust an audio reproducing time and a reproducing speed according to the gesture to the user terminal device. The "scratching" includes altering a pitch or speed of a currently-playing media, based on a movement of a user's hand. Accordingly, a reproducing time of audio data may be adjusted as if a real DJ-ing operation is performed. The user may check the adjusted time through the display 150 with his/her naked eyes. Also, the user who wears the wearable device 100 may perform various other adjusting or manipulating operations such as equalizing, adjusting a volume, stopping reproducing a content, resuming, pausing, and changing a content by making various gestures such as bending user's fingers, clenching user's fist, turning user's hand, or moving user's hand.

Figure 2:
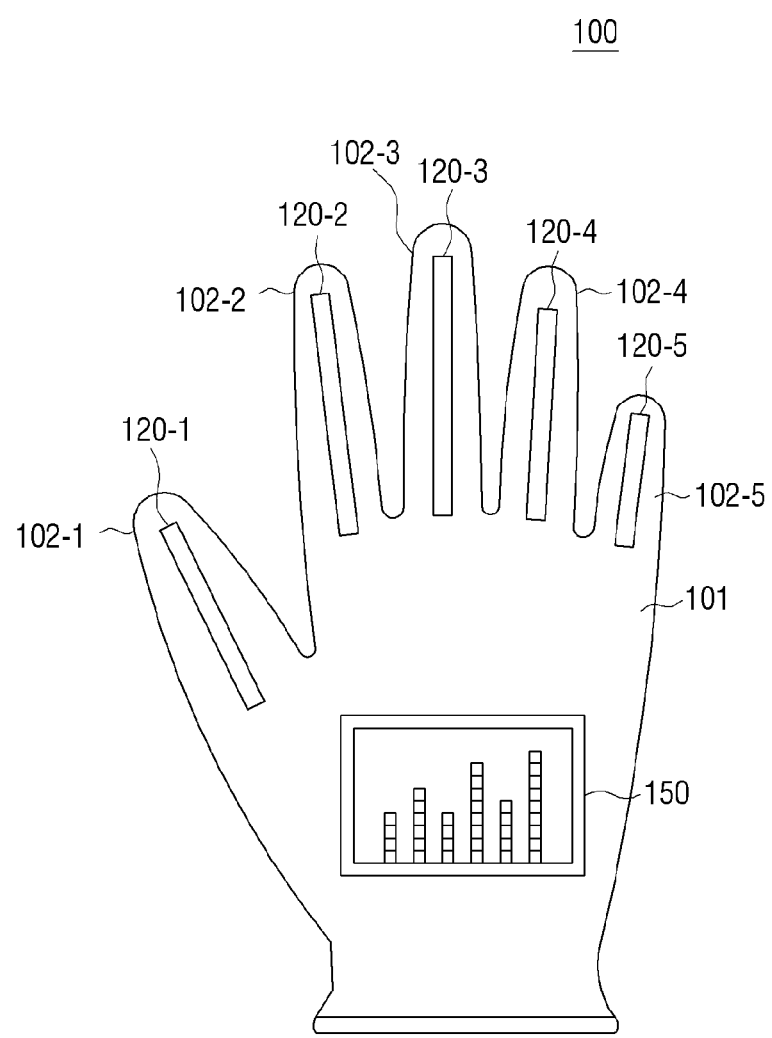
FIG. 2 is a view illustrating a configuration of a wearable device that is implemented in a glove shape.

FIG. 2 is a view illustrating an example of the wearable device 100 that is implemented in a glove shape. Referring to FIG. 2, the wearable device 100 may be a device of a glove shape including a plurality of finger parts 102-1 through 102-5 to allow a user's fingers to enter therein. Specifically, the wearable device 100 includes a body 101 that is formed in a glove shape and made of flexible material. The body 101 may be made of leather or fabric, or high molecular resin. The motion sensor 110, the bending sensor 120, the controller 130, the communication unit 140, and the display 150 may be attached to a surface of the body 101, or may be buried within the body 101 and supported by the body 101. Specifically, the motion sensor 110, the bending sensor 120, the controller 130, and the communication unit 140 may be disposed within an outer cover of the body 101, and only the display 150 may be disposed on an outer surface of the outer cover on the back of user's hand in the body 101.

The bending sensor 120 may include a plurality of bending sensors 120-1 through 120-5 each of which is disposed on each finger part 102-1 through 102-5. Accordingly, bending of the finger parts 102-1 through 102-5 may be sensed. Specifically, the bending sensors 120-1 through 120-5 may be implemented by using a strain gage. The strain gage senses deformation of a surface of an object to be measured according to a change in a resistance using metal or semiconductor that changes its resistance according to a degree of force applied thereto. It is common that material like metal has its resistance increased when its length is increased by an external force, and has its resistance reduced when the length is reduced. If each bending sensor 120-1 through 120-5 is disposed on an upper portion of each finger part 102-1 through 102-5, a tensile force is applied to the bending sensor when the user bends his/her finger and thus a resistance is increased. On the other hand, if each bending sensor 120-1 through 120-5 is disposed on a lower portion of each finger part 102-1 through 102-5, a compressive force is applied to the bending sensor when the user bends his/her finger and the resistance is reduced. When the resistance of each bending sensor 120-1 through 120-5 is changed, a magnitude of an electric signal output from each bending sensor 120-1 through 120-5 is changed. The controller 130 may sense bending by detecting a change in the output value of each bending sensor 120-1 through 120-5. The bending sensors 120-1 through 120-5 may be implemented by using piezoelectric sensors or other bend sensors besides the strain gage. Although only one bending sensor is provided on each finger part 102-1 through 102-5 in FIG. 2, the bending sensor may not be provided on some of the finger parts 102-1 through 102-5 or a plurality of bending sensors may be provided on one of the finger parts 102-1 through 102-5.

The display 150 may display a variety of information such as equalizing data that is generated by the equalizing operation performed by the external device 200, audio data information which is reproduced by the external device 200, an audio output volume, and an audio reproducing time. In FIG. 2, the display 150 displays equalizing data.

Figure 3:
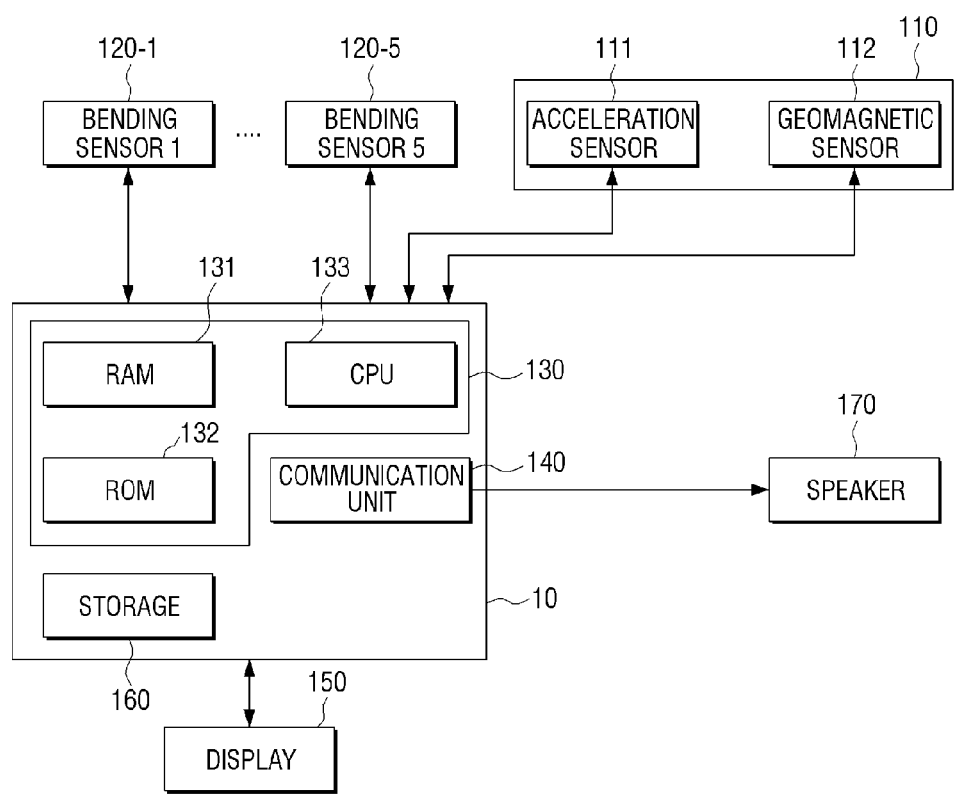
FIG. 3 is a block diagram illustrating an example of a detailed configuration of a wearable device.

FIG. 3 is a block diagram illustrating an example of a detailed configuration of the wearable device 100 of FIG. 2. Referring to FIG. 3, the wearable device 100 includes a motion sensor 110, a plurality of bending sensors 120-1 through 120-5, a controller 130, a communication unit 140, a display 150, a storage 160, and a speaker 170.

The storage 160 may be implemented by a flash memory or other various storage elements. The storage 160 may store various data such as operating system (OS) software to drive the wearable device 100, various applications, a program such as a widget, various data that are input or set while a program is being executed, contents, a table on which a sensing value of each sensor and user's movement information matching with the sensing value are recorded, and a control code matching a user's movement.

The speaker 170 is an element that outputs various audio signals. The controller 130 may output audio signals received from the external device 200 through the communication unit 140 through the speaker 170.

Although not illustrated in FIG. 3, the wearable device may further include an amplification circuit to amplify audio signals, a noise filter to filter noise from the audio signals, and a connection jack to provide the audio signals to an ear phone or a head phone.

The controller 130, the communication unit 140, and the storage 160 may be mounted on a single board 10. Although the board 10 is disposed on the same layer as that of the display 150 in parallel with the display 150 in FIG. 3, the board 10 may be disposed on a lower layer of the display 150.

The controller 130 mounted on the board 10 may include a random access memory (RAM) 131, a read only memory (ROM) 132, and a central processing unit (CPU) 133. The CPU 133 accesses the storage 160 and performs booting using the OS stored in the storage 160. The CPU 133 performs various operations using various programs, contents, and data stored in the storage 160. The ROM 132 may store a set of commands to boot a system. When a turn on command is input and power is supplied, the CPU 133 copies the OS stored in the storage 160 into the RAM 131 according to a command stored in the ROM 132, executes the OS, and boots the system. When booting is completed, the CPU 133 copies various program stored in the storage 160 into the RAM 131, executes the programs copied into the RAM 131, and performs various operations. When booting is completed, the CPU 133 may activate the bending sensors 120-1 through 120-5 and the motion sensor 110. Also, when sensing values are input from the sensors, the CPU 133 combines the sensing values and compares the combined sending value with data stored in the storage 160. Accordingly, the CPU 133 generates a control signal corresponding to what movement the user makes and provides the control signal to the communication unit 140. The communication unit 140 converts the control signal into a signal of a format corresponding to a defined communication standard.

The motion sensor 110 may include an acceleration sensor 111 and a geomagnetic sensor 112. Also, the motion sensor 110 may include a gyro sensor instead of the geomagnetic sensor 112, and may use the geomagnetic sensor 110 and the gyro sensor altogether.

The acceleration sensor 111 senses a degree of inclination using gravity. That is, if a gravity value is 1g when the acceleration sensor 111 senses an object in a vertical direction, a value smaller than 1g is output when inclination of the object is sensed, and a value of −1g is output when the object is turned upside down. The acceleration sensor 111 may output a pitch angle and a roll angle using this principle. The acceleration sensor 11 may use a 2-axis or 3-axis fluxgate. If the wearable device 100 is implemented in a glove shape, the acceleration sensor 111 of a large volume may cause inconvenience and thus the acceleration sensor 110 may be implemented by using a 2-axis acceleration sensor 111 using two intersecting fluxgate sensors in this exemplary embodiment.

The geomagnetic sensor 112 measures an intensity and a direction of magnetism of the earth, and in particular, a geomagnetic sensor using a flux gate may be referred to as a fluxgate type geomagnetic sensor. The geomagnetic sensor 112 may also be implemented by using a 2-axis or 3-axis fluxgate sensor like the acceleration sensor 111.

Figure 4:
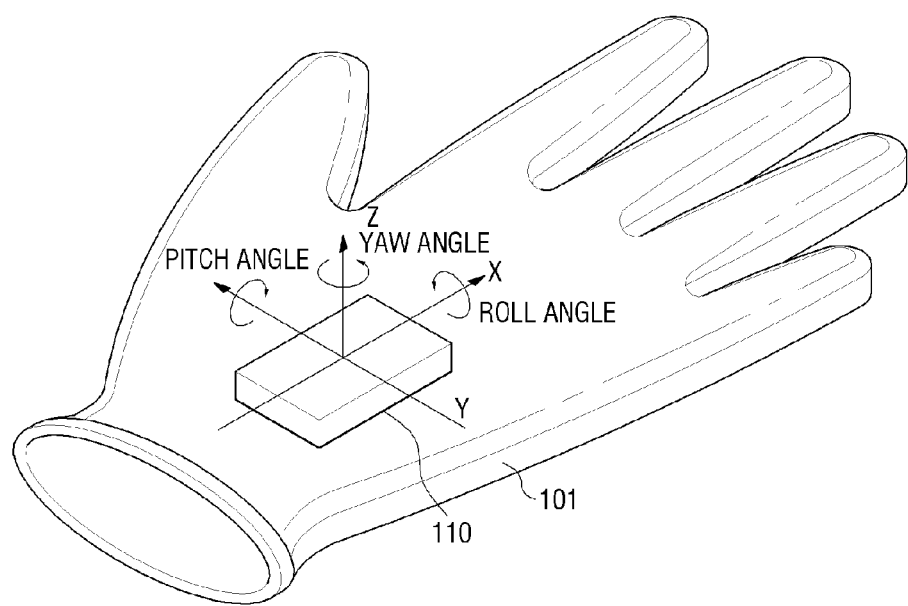
FIG. 4 is a view to explain a method of sensing a motion of a wearable device.

FIG. 4 is a view to explain types of motions that can be sensed by the motion sensor 110. If the motion sensor 110 is embedded in the body 101 of the wearable device 100 as illustrated in FIG. 4, X, Y, and Z axes intersecting one another are determined according to a placement direction of a fluxgate. A pitch angle refers to a rotation angle that is measured when the wearable device 100 is rotated about the Y axis, a roll angle refers to a rotation angle that is measured when the wearable device 100 is rotated about the X axis, and a yaw angle refers to a rotation angle that is measured when the wearable device 100 is rotated about the Z axis. The pitch angle and the roll angle may be measured by the acceleration sensor 111 and the yaw angle may be measured by the geomagnetic sensor 112 or the gyro sensor.

Figure 5:
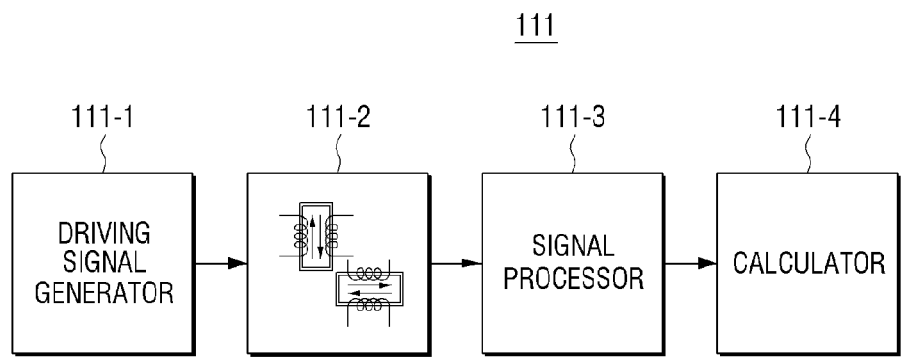
FIG. 5 is a block diagram illustrating an example of a detailed configuration of a motion sensor, particularly an acceleration sensor.

FIG. 5 is a view illustrating an example of a detailed configuration of the acceleration sensor 111. Referring to FIG. 5, the acceleration sensor 111 includes a driving signal generator 111-1, a 2-axis fluxgate 111-2, a signal processor 111-3, and a calculator 111-4. The driving signal generator 111-1 generates a pulse wave and a revered pulse wave to drive the 2-axis flux gate 111-2, and applies them to the 2-axis flux gate 111-2.

The 2-axis flux gate 111-2 includes two intersecting flux gates. Each flux gate includes a magnetic core of a square ring or bar type, and a driving coil and a detection coil that are wound around the magnetic core.

The signal processor 111-3 performs a series of processing operations such as amplifying and chopping with respect to an electric signal detected by the detection coil, and then outputs a voltage value corresponding to each axis. The calculator 111-4 may calculate a pitch angle and a roll angle based on the output voltage value. Specifically, first, the calculator 111-4 normalizes the output values of the acceleration sensors of the X-axis and Y-axis by mapping them onto output values of a predetermined range. Accordingly, normalizing may be performed according to following equation:

$$Xt_{norm} = \frac{2Xt - (Xt_{max} + Xt_{min})}{Xt_{max} - Xt_{min}} \quad \text{[Equation 1]}$$

$$Yt_{norm} = \frac{2Yt - (Yt_{max} + Yt_{min})}{Yt_{max} - Yt_{min}}$$

wherein Xt is an output value of an X-axis acceleration sensor, Yt is an output value of a Y-axis acceleration sensor, $Xt_{norm}$ is a normalized output value of the X-axis acceleration sensor, and $Yt_{norm}$ is a normalized output value of the Y-axis acceleration sensor When normalizing is performed, the calculator 111-4 may measure a pitch angle ($\theta$) and a roll angle ($\phi$) using following equation:

$$\theta = \sin^{-1}(Xt_{norm}) \quad \text{[Equation 2]}$$

$$\phi = \sin^{-1}\left(\frac{Yt_{norm}}{\cos\theta}\right)$$

wherein $Xt_{norm}$ is a normalized output value of the X-axis acceleration sensor, $Yt_{norm}$ is a normalized output value of the Y-axis acceleration sensor, $\theta$ is a pitch angle, and $\phi$ is a roll angle.

The geomagnetic sensor 112 may be implemented by using a configuration similar to the acceleration sensor 111. First, the geomagnetic sensor 112 normalizes output values of the X-axis and Y-axis fluxgates using following equation:

$$Xf_{norm} = \frac{(Xf - Xf_{bias})}{Xf_{sf}} \quad \text{[Equation 3]}$$

$$Yf_{norm} = \frac{(Yf - Yf_{bias})}{Yf_{sf}} * \alpha$$

$$Xf_{bias} = \frac{Xf_{max} + Xf_{min}}{2},$$

$$Xf_{sf} = \frac{Xf_{max} - Xf_{min}}{2}$$

$$Yf_{bias} = \frac{Yf_{max} + Yf_{min}}{2},$$

$$Yf_{sf} = \frac{Yf_{max} - Yf_{min}}{2}$$

wherein Xf and Yf are real output values of the X-axis and Y-axis geomagnetic sensors, $Xf_{norm}$ and $Yf_{norm}$ are normalized values of the X-axis and Y-axis, $Xf_{max}$ and $Xf_{min}$ are maximum and minimum values of Xf, and $Yf_{max}$ and $Yf_{min}$ are maximum and minimum values of Yf. Although not illustrated in Equation 3, each of the normalized values may further be multiplied by a pre-defined constant.

The geomagnetic sensor 112 may calculate a direction in which the geomagnetic sensor 112 is placed, that is, azimuth, in a 3D space using the normalized values. Since the azimuth is a 3D space value expressed by three axes, an output value of a Z axis which is perpendicular to a plane formed of the X-axis and the Y-axis is also required when the azimuth is calculated. However, since the output value of the Z-axis cannot be calculated directly if the geomagnetic sensor 112 is formed of 2-axis fluxgates, the output value of the Z-axis should be calculated virtually. The geomagnetic sensor 112 may calculate a virtually normalized output value of the Z-axis by substituting the normalized output values of the X-axis and Y-axis, the pitch angle, the roll angle, and a magnetic dip corresponding to the following equation:

$$Zf_{norm} = \frac{(Xf_{norm} * \sin\theta - Yf_{norm} * \cos\theta * \sin\phi + \sin\lambda)}{\cos\theta * \cos\phi} \quad \text{[Equation 4]}$$

wherein Zf is a virtual voltage value of the Z-axis, $Zf_{norm}$ is a normalized voltage value of the Z-axis, $\lambda$ is a magnetic dip, $\theta$ is a pitch angle, and $\phi$ is a roll angle.

When the normalized voltage value of the Z-axis is calculated in this way, azimuth may be finally calculated using following equation:

$$\alpha = \tan^{-1}\left(\frac{Zf_{norm} * \sin\phi - Yf_{norm} * \cos\phi}{Xf_{norm} * \cos\theta + Yf_{norm} * \sin\theta * \sin\phi + Zf_{norm} * \sin\theta * \cos\phi}\right) \quad \text{[Equation 5]}$$

wherein α is azimuth, $Xf_{norm}$, $Yf_{norm}$, and $Zf_{norm}$ are normalized output values of the X-axis, Y-axis, and Z-axis fluxgates, respectively, θ is a pitch angle, φ is a roll angle, and λ is a magnetic dip.

The controller 130 may know in which direction and how much the wearable device 100 is rotated by comparing azimuth calculated by the geomagnetic sensor 112 and previously calculated azimuth. That is, if the previous azimuth is α and the current azimuth is α+30, it may be determined that the wearable device 100 is rotated by 30° in a clockwise direction. Also, the controller 130 may determine in which direction and how much the wearable device 100 is inclined according to a change in the pitch angle or roll angle calculated by the acceleration sensor 111.

The controller 130 may read a user's movement by combining the sensing values of the bending sensors 120-1 through 120-5 and the sensing value of the motion sensor 110.

For example, when there is no change in the resistance value output from the second bending sensor 120-2 and bending is sensed by the other bending sensors 120-1 and 120-3 to 120-5 in the wearable device of the shape of FIG. 2, the controller 130 determines that the second finger is stretched and the other fingers are bent. Also, when the pitch angle sensed by the motion sensor 110 is changed, the controller 130 determines whether the finger points to the ground or sky according to a sign of the pitch angle. If the azimuth of the motion sensor 110 is changed when the wearable device 100 is inclined in a direction in which the finger points to the ground, the controller 130 may determine in which direction the wearable device is moved according to the azimuth. As described above, the controller 130 determines a movement of the user who wears the wearable device 100 by combining results of sensing the pitch angle, the roll angle, the azimuth, and the bending. Also, when all of the bending sensors 120-1 through 120-5 are sensed as being bent, the controller 130 determines that the user clenches his/her fist, and, if all of the bending sensors 120-1 through 120-5 are sensed as being stretched, the controller 130 determines that the user stretches his/her fingers. In this state, the controller 130 determines a movement based on the sensing value of the motion sensor 110. The controller 130 generates a control signal corresponding to the determined movement. A type of the movement and a type of the control signal corresponding to the movement may be set differently according to a type of a program executed in the external device 200. When a program providing a DJ-ing operation is executed while an audio content is being reproduced, the controller 130 generates a control signal to perform various control operations such as scratching, volume up, equalizing, mixing, and sampling according to the movement of the wearable device 100, and may transmit the control signal to the external device 200.

Although a single wearable device has been described above, a plurality of wearable devices in a glove shape may be provided in a pair.

Figure 6:
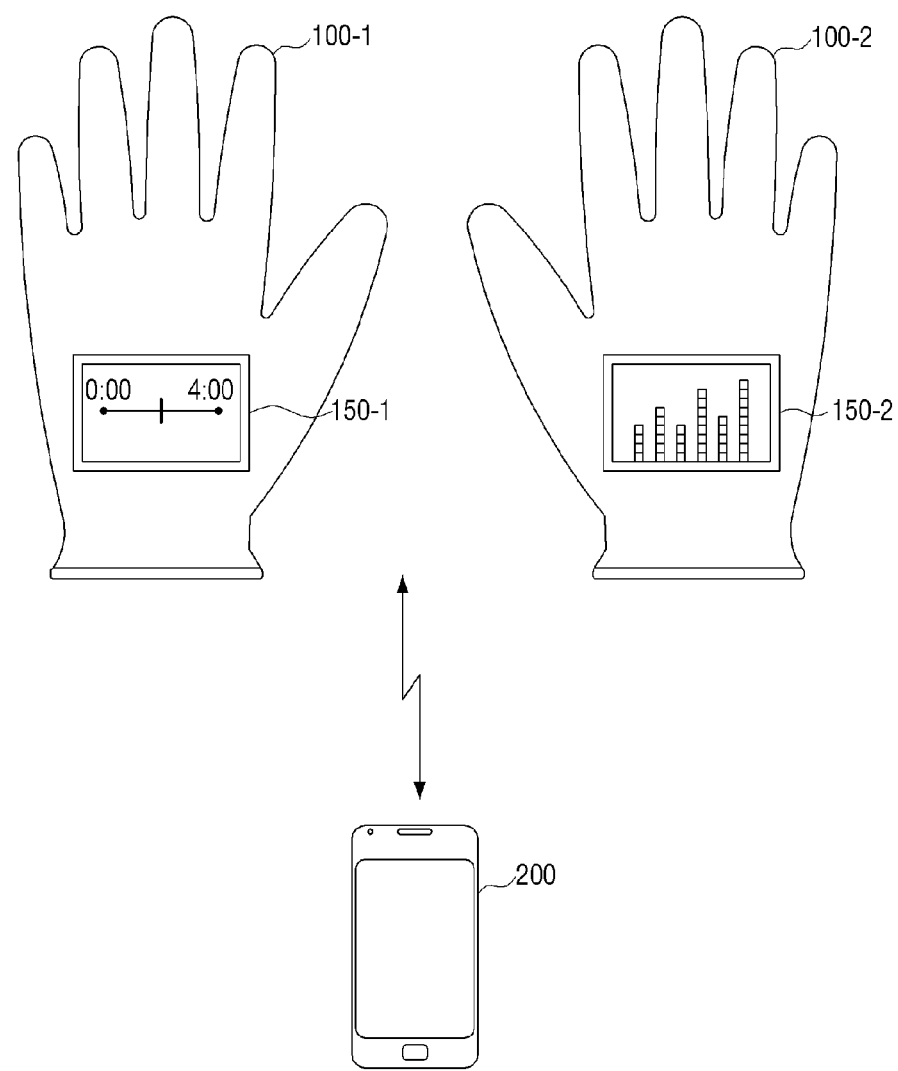
FIG. 6 is a view to explain an operation of a wearable device that is provided in a pair.

Referring to FIG. 6, the wearable device 100 may include a pair of a left-hand glove 100-1 and a right-hand glove 100-2. Both the left-hand glove 100-1 and the right-hand glove 100-2 may include the elements described above. For example, a plurality of motion sensors 110, a plurality of bending sensors 120, a plurality of controllers 130, a plurality of communication units 140, and a plurality of displays 150 are provided and may be disposed in the left-hand glove 100-1 and the right-hand glove 100-2. Also, the speaker 170 and the storage 160 may be disposed in each of the left-hand glove 100-1 and the right-hand glove 100-2.

In this case, the controller 130 disposed in each of the gloves 100-1 and 100-2 transmits a control signal corresponding to a movement of the corresponding glove to the external device 200, and controls the operation of the external device 200. For example, the controller disposed in the left-hand glove 100-1 may adjust an audio reproducing time of the external device 200 according to movement of the left-hand glove 100-1. FIG. 6 illustrates a result of adjusting an audio reproducing time which is displayed on the display 150-1 of the left-hand glove 100-1. The user may perform scratching of DJ-ing operations by placing his/her left hand wearing the left-hand glove 100-1 on a table and rubbing the table with his/her left hand. Also, the controller disposed in the right-hand glove 100-2 may control equalizing of the external device 200 according to a movement of the right-hand glove 100-2. In this case, a result of equalizing may be displayed on the display 150-2 of the right-hand glove 100-2 as illustrated in FIG. 6. As described above, the user may control the audio reproducing operation of the external device 200 using the plurality of wearable devices simultaneously. In particular, the user may perform DJ-ing operations by performing a real DJ gesture.

When it is determined that a predetermined end motion occurs, the controller 130 may generate an end signal to finish adjusting audio data and store adjusted data, and may transmit the end signal to the external device 200. The end motion may be implemented variously. For example, various motions such as a motion of joining both hands, a motion of drawing a specific shape in the air with fingers being stretched, and a motion of clenching a fist, may be the end motion. When the end signal is received, the external device 200 stores the audio content that has been adjusted until the end signal is received. Accordingly, adjustment such as remix and sampling may be performed with respect to the audio content.

Although the left-hand glove 100-1 and the right-hand glove 100-2 are operated separately in FIG. 6, the left-hand glove 100-1 and the right-hand glove 100-2 may be connected to each other through a wired or wireless interface. In this case, the motion sensor 110, the bending sensor 120, and the display 150 may be disposed in each of the left-hand glove 100-1 and the right-hand glove 100-2, and the controller 130, the communication unit 140, the storage 160, and the speaker 170 may be disposed in only one glove. That is, the controller 130 disposed in one glove may sense a whole movement of the user based on the sensing values sensed by the both gloves 100-1 and 100-2. In this case, the controller 130 may combine the movements of the gloves 100-1 and 100-2 and transmit one control signal to control the operation of the external device 200. Accordingly, when a result of adjusting is transmitted from the external device 200, the controller 140 may divide the result of the adjusting and display divided results on the displays 150-1 and 150-2 of the gloves 100-1 and 100-2.

Although the gloves 100-1 and 100-2 include the displays 150-1 and 150-2, respectively, as illustrated in FIG. 6, a single display may be provided on only one glove (either the left-hand glove 100-1 or the right-hand glove 100-2), and the speaker may be provided the other glove (the other of the left-hand glove 100-1 and the right-hand glove 100-2) according to an exemplary embodiment of the present general inventive concept. Also, the displays 150-1 and 150-2 may be implemented in different sizes, locations, shapes, and types. For example, an LED array display 150-2 may be provided on the right-hand glove 100-2 to display equalizing data, and an LCD display 150-1 of high resolution may be provided on the left-hand glove 100-1 to display other detailed information.

Although reproduction of an audio content has been described mainly in the above example, the wearable device 100 may be operated in a similar method when a video content is reproduced. In this case, detailed information on the video content, a reproducing time, and an example of a movement that can be made by the user to control a content reproducing operation may be displayed on the display. Also, when game programs, widgets, or other applications are executed, the external device 200 may be controlled based on a movement corresponding to each program and a control operation matching the movement.

As described above, the wearable device 100 should have flexibility to be worn on the user's body. Therefore, a number of parts having rigidity should be reduced if possible.

According to an exemplary embodiment, a power supply 180 to supply power to each element of the wearable device 100 may be made of flexible material.

Figure 7:
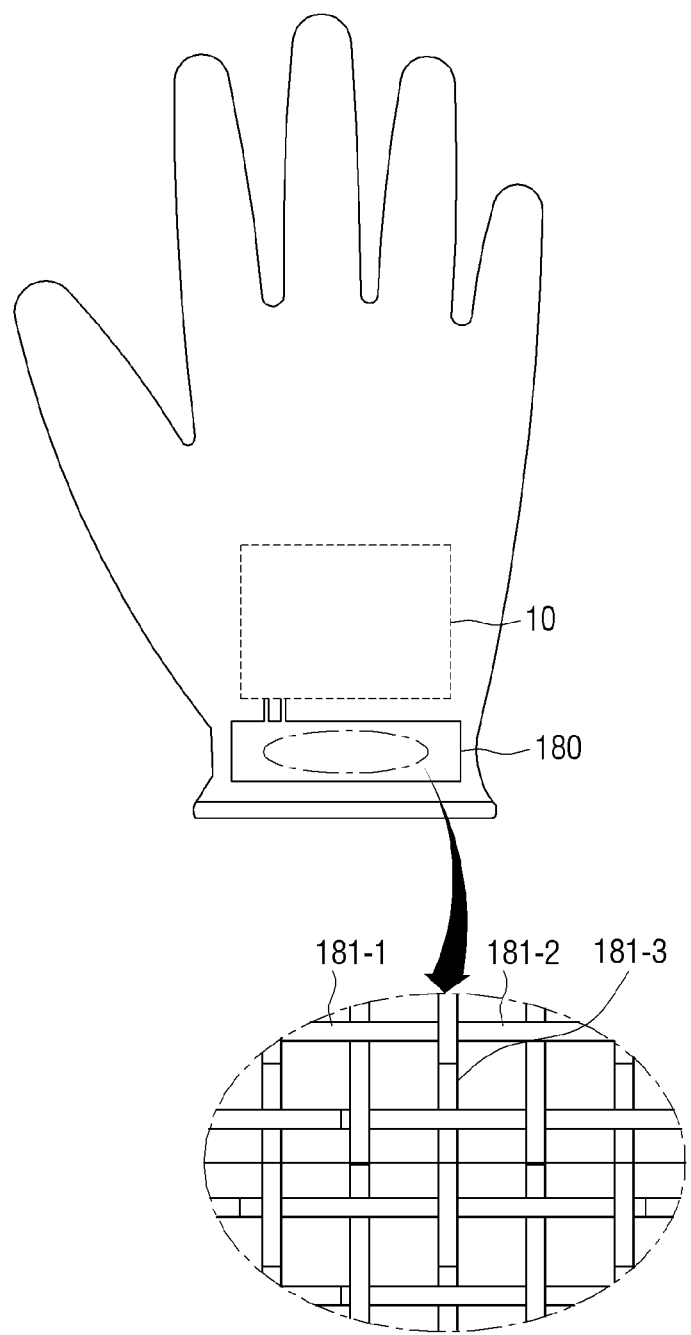
FIG. 7 is a view illustrating an example of a power supply that is provided in a wearable device.

FIG. 7 illustrates an example of a configuration of a wearable device 100 which includes a power supply 180 made of flexible material. Referring to FIG. 7, the wearable device 100 may include the power supply 180 to be embedded in the body 101 to supply power to be used by various elements such as the motion sensor 110, the bending sensor 120, the controller 130, the communication unit 140, and the display 150. The power supply 180 is connected to a board 10 and the controller 130 may switch power supplied to each element through a power supply circuit on the board 10. Specifically, in order to minimize power consumption of a battery, the controller 130 may shut off power supplied to various elements including the motion sensor 110 and the bending sensor 120, or may lower the power to standby power and inactivate the elements. In this case, when a specific program is executed in the external device 200 and a trigger signal is transmitted to the wearable device 100, the controller 130 activates each element. In particular, the controller 130 activates the motion sensor 110 or the bending sensor 120, and determines a user's movement.

The power supply 180 may be a primary battery or a secondary battery. Also, the power supply 180 may be made of flexible material according to a characteristic of the body 101. In FIG. 7, a plurality of line batteries 181-1, 181-2, and 181-3 are connected to one another in series, thereby forming a single line, and the power supply 180 is formed as fabric by crossing the lines. Although the power supply 180 is disposed only on a part of the body 101 of the wearable device 100, the entire body 101 may be implemented as the power supply 180. That is, as illustrated in FIG. 7, a fabric structure of a glove shape supporting elements such as various sensors and the controller may be manufactured by connecting the plurality of lines having flexibility as illustrated in FIG. 7.

Figure 8:
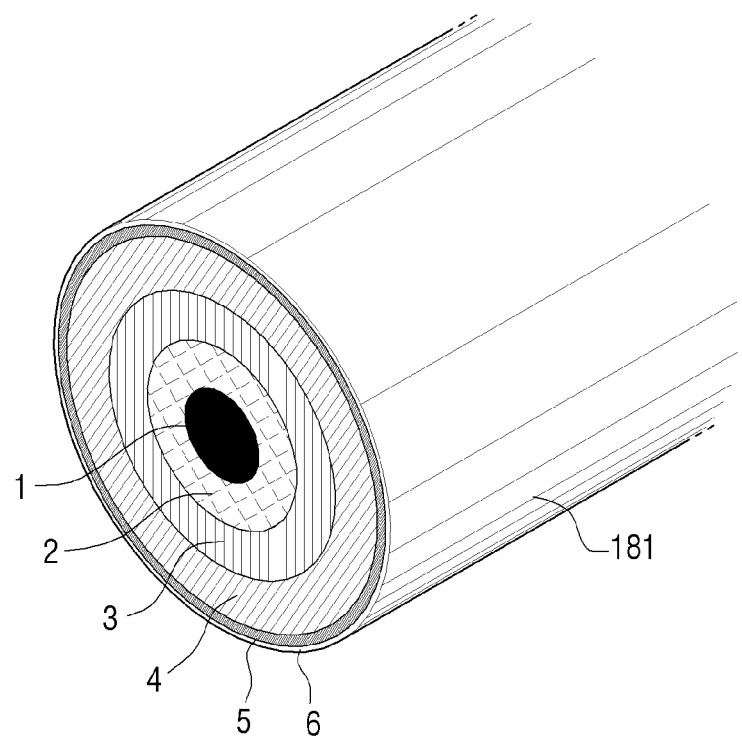
FIG. 8 is a view illustrating a cross section of a flexible battery that constitutes the power supply of FIG. 7.

FIG. 8 is a view illustrating an example of an inner structure of one line battery 181. Referring to FIG. 8, the line battery 181 is formed in such a way that an inner collector 1, an inner electrode 2, an electrolytic part 3, an external electrode 4, an external collector 5, and a sheath 6 are formed from the inside to outside the line battery 181 in sequence.

The inner collector 1 may be implemented by using an alloy such as TiNi having good elasticity, a carbon fiber, or other conducting polymers. A surface of the inner collector 1 is covered by the inner electrode 2. The inner electrode 2 may be implemented by using various materials according to an electrode characteristic. If the inner electrode 2 is used as a negative electrode, the inner electrode 2 may be made of negative electrode material such as lithium or natrium. In this case, since the external electrode 4 is used as a positive electrode, the external electrode 4 may be made of positive electrode material such as sulfur and metal sulfide. If the inner electrode 2 is used as a positive electrode and the external electrode 4 is used as a negative electrode, the inner electrode 2 and the external electrode 4 are implemented conversely. A surface of the inner electrode 2 is covered by the electrolytic part 3. The electrolytic part 3 physically isolates the inner electrode 2 and the external electrode 3 from each other, and also may have the two electrodes exchange ions. The electrolytic part 3 may be formed in various types such as a gel type, a porous type, and a solid type. The external electrode 4 is disposed outside the electrolytic part 3 and the external collector 5 is disposed outside the external electrode 4. The external collector 5 may be made of various materials like the inner collector 1 described above. The sheath 6 is formed on an outside of the external collector 5. The sheath may use a general polymer resin. For example, PVC or epoxy resin may be used. Besides these, any material that can prevent damage of a thread-type cell and is freely flexible or bendable may be used to form the sheath 6. The battery configuration of FIG. 8 is merely an example and is not limited thereto.

Figure 9:
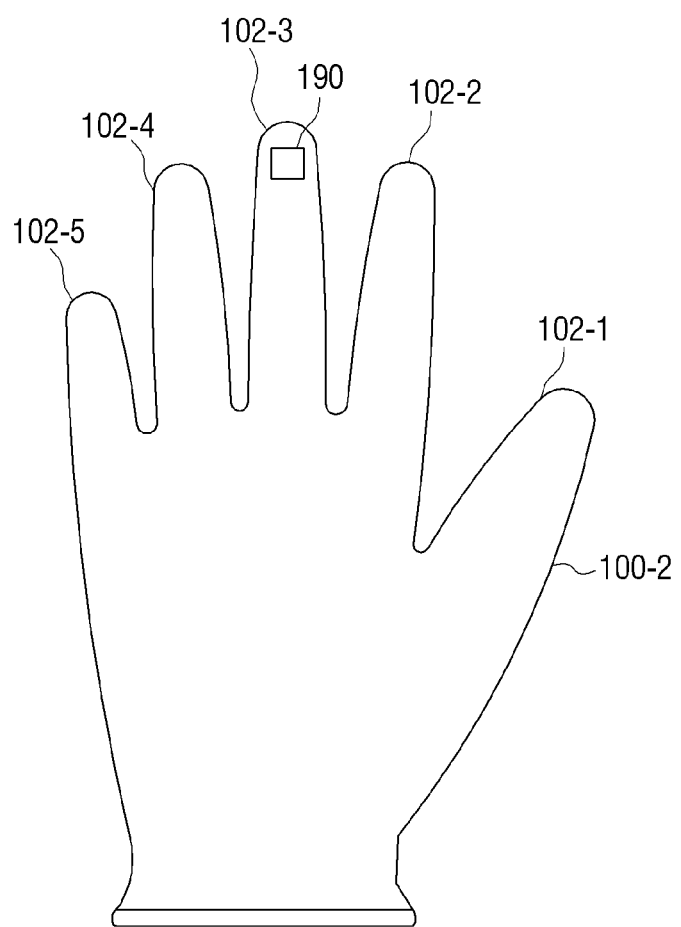
FIG. 9 is a view illustrating a configuration of a wearable device that includes a touch sensor according to another exemplary embodiment of the present general inventive concept.

According to still another exemplary embodiment, the wearable device 100 may further include a touch sensor 190. FIG. 9 illustrates a wearable device which determines a user's movement more exactly using the touch sensor 190.

Referring to FIG. 9, the touch sensor 190 may be provided on an end of the finger part 102-3 of the body 101. FIG. 9 illustrates a palm of the right-hand glove 100-2 of the wearable device 100. The touch sensor 190 may be provided on the end of the middle finger. Accordingly, when the user touches a table or other thing or his/her body with the middle finger of his/her right hand, the touch sensor 190 notifies the controller 130 of touch.

When touch is notified, the controller 130 regards only the signals sensed by the motion sensor 110 or the bending sensor 120 as effective information and determines a movement. When touch does not occur, the controller 130 may disregard the signals sensed by the motion sensor 110 or the bending sensor 120. That is, only if touch is sensed by the touch sensor 190, the controller 130 determines that the user intends to use the wearable device 100 and controls the external device 200. Accordingly, the wearable device 100 can be prevented from malfunctioning in an unexpected situation. The touch sensor 190 may be implemented by using a pressure sensor.

Although the touch sensor 190 is provided only on one finger in FIG. 9, the touch sensor 190 may be provided on every finger or may be provided on the palm or the back of the hand. Also, the touch sensor 190 may be disposed in the left-hand glove 100-1.

Figure 10:
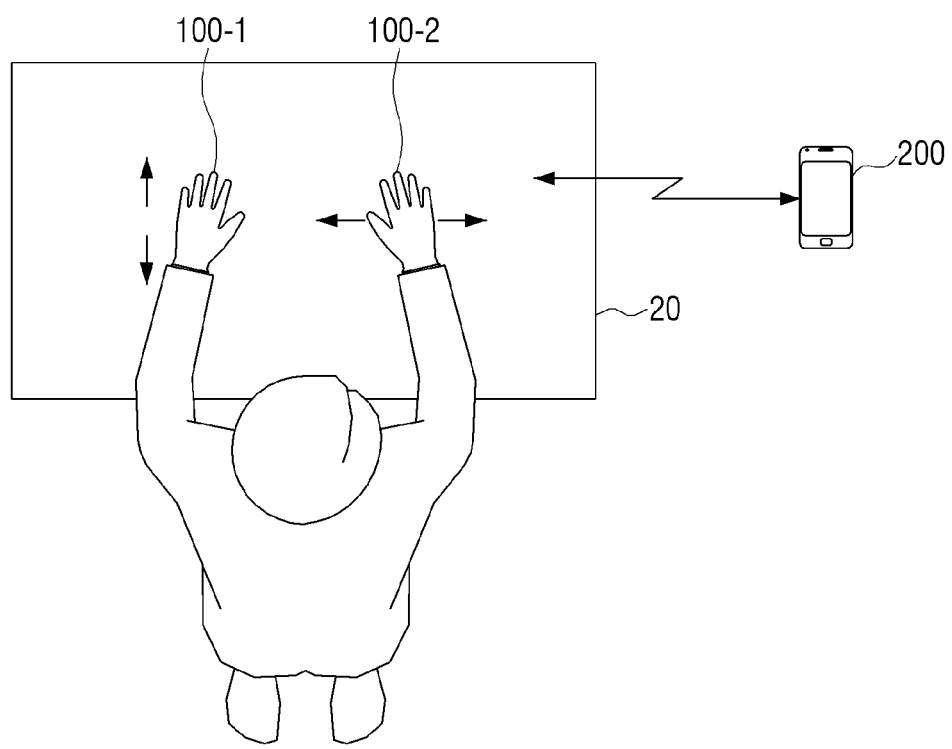
FIG. 10 is a view to explain a Disc Jockey-ing (DJing) operation using a wearable device.

FIG. 10 is a view illustrating a state in which the user controls the external device 200 using the wearable device including the touch sensor 190. Referring to FIG. 10, the user wears a pair of wearable devices 100-1 and 100-2 and touches a surface of a table 20, and moves the left and right hands in various directions while still touching. Also, the user may tap or double tap the surface of the table 20, or may strongly press the surface of the table 20 with his/her finger provided with the touch sensor. By combining such movements, various operations such as changing a content or reproducing a content may be performed. For example, if the wearable device includes the touch sensors 190 provided on every finger part 102-1 through 102-5, when the user taps with his/her index finger while an audio content is being reproduced, an operation of adding a drum sound may be performed. Also, when the user makes a gesture as if he/she strikes keys, an operation of reproducing or adding a key sound may be performed. Also, when the user rubs the table with his/her left hand in a vertical direction while tapping with the index finger of his/her left hand, equalizing may be adjusted, and, when the user rubs the table with his/her left hand in the vertical direction while double tapping, an output volume may be adjusted. When the user rubs the table with his/her right hand in a horizontal direction, scratching may be performed. Such a matching relationship between movements and control operations is merely an example and may be set differently according to a situation.

The external device 200, that is, a user terminal device, performs various control operations according to various control signals transmitted from the wearable device.

Figure 11:
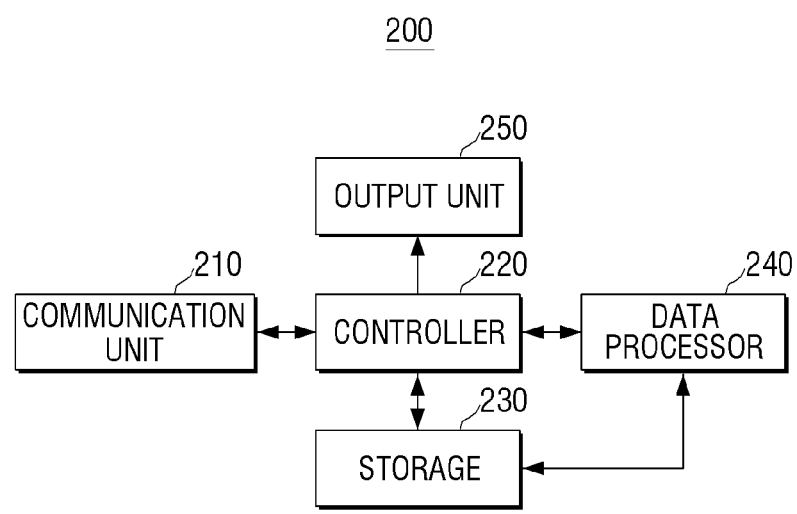
FIG. 11 is a block diagram illustrating a configuration of a user terminal device according to an exemplary embodiment of the present general inventive concept.

FIG. 11 is a block diagram illustrating a configuration of a user terminal device 200 according to an exemplary embodiment. As illustrated in FIG. 11, the user terminal device 200 includes a communication unit 210, a controller 220, a storage 230, a data processor 240, and an output unit 250.

The communication unit 210 communicates with the wearable device 100. As described above, one of various communication methods such as Wi-Fi, Bluetooth, Zigbee, IEEE and NFC may be selected and applied.

The storage 230 stores various O/Ss or applications necessary to drive the user terminal device 200, operational information corresponding to a control code, and contents.

The controller 220 may selectively execute an application stored in the storage 230 according to user's selection. An execution screen according to execution of the application is displayed on a screen through the output unit 250. The user may select an application or a content using various inputting means provided on the wearable device 100 or the user terminal device 200.

For example, the user may select an application or a content by touching the screen of the user terminal device 200 or manipulating a button attached to the user terminal device 200. When using the wearable device 100, the user may activate the user terminal device 200 by making a specific motion while wearing the wearable device 100. When the user terminal apparatus 200 is activated, the controller 220 may control the output unit 250 to display icons or identification information on various executable applications or contents. The user may select an application or a content by moving a cursor on the screen by moving user's hand wearing the wearable device 100. When one application or content is selected, the user may input a command to execute the application or a command to reproduce the content by moving user's finger or tapping. Accordingly, when the application is executed, icons of contents executable in the application or a list of contents is displayed, and the user selects a content and inputs a reproduction command by performing the above-described operation. Furthermore, the user may also build a playlist including various contents by making various gestures while wearing the wearable device 100. If the content is reproduced according to the reproduction command, the user may adjust the content by moving the hand wearing the wearable device in various ways as described above.

The data processor 240 reads out the content selected by the user from the storage 230, and converts the content into a signal of a reproducible format by performing various video processing and audio processing such as decoding and scaling with respect to the content.

The output unit 250 outputs a video signal and an audio signal which are processed by the data processor 240 through the screen and the speaker, respectively.

The controller 220 provides a variety of information such as a result of the processing by the data processor 240, the processed video and audio signals, information on the content, and information on the application, that is, a result of the adjusting by the wearable device 100, to the wearable device 100 through the communication unit 210. Accordingly, the wearable device 100 may output the result of the adjusting through the display 150 or the speaker 170.

When a program performing a DJ-ing operation is executed as described above, the controller 220 may perform various DJ-ing operations according to a control signal transmitted from the wearable device 100. For example, when scratching is performed, the controller 220 adjusts a reproducing time of the audio signal forward or backward according to a scratching direction. Accordingly, a remixed audio signal may be output.

On the other hand, when a movement to control equalizing is made, the controller 220 controls the data processor 240 to perform equalizing according to the movement. The equalizing refers to an operation that adjusts a frequency characteristic of an audio signal. To perform equalizing, the data processor 240 may include an equalizer amplifier and an equalizer. The equalizer amplifier refers to a circuit for stressing or attenuating a specific register. The equalizer refers to a configuration that generates an audio signal by adjusting a frequency of a sound using a frequency transforming method such as fast fourier transform. The equalizer may include various kinds of equalizers such as a graphic equalizer that boosts or cuts a frequency using a slide volume in each register, or a parametric equalizer that continuously changes a boosted or cut frequency. The program to perform the DJ-ing operation may use the graphic equalizer. The controller 220 controls such elements according to the control signal to perform the equalizing operation, and transmits GUI information corresponding to the equalizing to the wearable device 100 through the communication unit 210.

Accordingly, the wearable device 100 may display equalizing information on the display 150.

According to still another exemplary embodiment, the controller 220 may limit a characteristic adjusting range of the audio signal and the video signal to a specific range, when being controlled by the wearable device 100. That is, when the user wearing the wearable device 100 inadvertently makes a big motion to adjust an audio output volume, the audio signal may be output loudly. To prevent this, the controller 220 may limit a characteristic adjusting range such as an audio output volume or an equalizing range in a mode in which it is controlled by the wearable device 100. Even if the audio volume is allowed to increase from 1 to 100 levels, the audio volume is adjusted within a range from 1 to 50 levels in the mode in which the user terminal device is controlled by the wearable device 100. In this case, even when a volume up command is continuously transmitted from the wearable device 100 while the output volume is at a 50 level, the controller 220 does not turn up the volume anymore and maintains it at the 50 level. On the other hand, in a general mode in which the user terminal device 200 is controlled by a touch panel or a button provided thereon rather than the wearable device 100, the characteristic adjusting range may not be limited.

In the above-described exemplary embodiments, the controller 130 of the wearable device 100 determines a movement based on the sensing value of each sensor 110 and 120, and transmits a control signal including a control code corresponding to the movement. However, this is merely an example and the operations of determining a movement and determining a control operation corresponding to the movement may be performed by the user terminal device 200.

That is, according to still another exemplary embodiment, the controller 130 of the wearable device 100 may transmit a control signal including sensing values sensed by the motion sensor 110 and the bending sensor 120 as they to the user terminal device 200.

The user terminal device 200 may analyze the sensing values included in the control signal and determine a user's movement, and may perform a control operation matching the movement. In this case, information on a user's movement or sensing values and a control operation matching these may be already stored in the storage 230 of the user terminal device 200.

As described above, the present disclosure may be embodied according to various exemplary embodiments.

Figure 12:
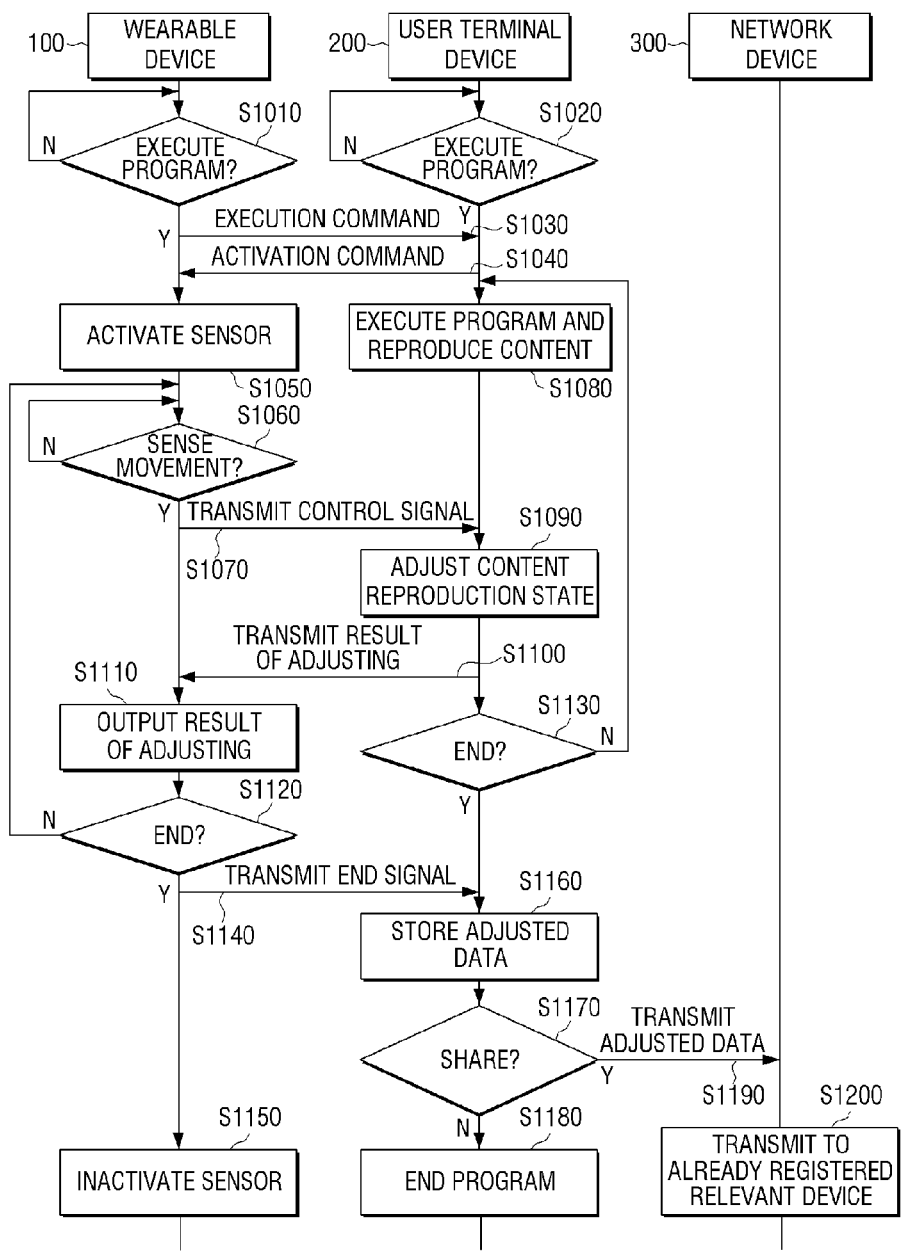
FIG. 12 is a view to explain an operation of a content adjusting system that includes a wearable device and a user terminal device.

FIG. 12 is a view to explain an operation of a content adjusting system according to an exemplary embodiment of the present general inventive concept. Referring to FIG. 12, the content adjusting system may include a wearable device 100 and a user terminal device 200, and may be interlocked with an external network device 300. Although operations between one wearable device 100 and one user terminal device 200 have been described in the above exemplary embodiments and in FIG. 12, the number of these devices is not limited. That is, a plurality of different user terminal devices 200 may be controlled using one wearable device 100, or vice versa.

Referring to FIG. 12, the wearable device 100 or the user terminal device 200 may determine whether an event to execute a program is generated. The wearable device 200 may determine that a program execution event is generated when a user wears the wearable device 100, selects a specific button attached to the wearable device 100, or makes a specific gesture while wearing the wearable device 100 (S1010). When it is determined that such an event is generated, the wearable device 100 transmits an execution command (S1030).

On the other hand, the user terminal device 200 also determines whether a program execution event is generated (S1020). Specifically, it is determined that the program execution event is generated when an icon corresponding to a program is selected or a remote control signal is input. When the user terminal device 200 executes a program by itself, the user terminal device 200 may transmit an activation command (S1040). The wearable device 100 may activate each sensor according to the activation command (S1050). That is, as usual, the wearable device 100 activates only one of the sensors provided therein and senses whether the above-described program execution event is generated, and, when the activation command is input, activates all of the sensors.

The user terminal device 200 executes a program or reproduces a content by itself when a program execution command is input or an execution command is received (S1080). The process of selecting a program or a content has been described above in detail and thus a redundant explanation thereof is omitted.

The wearable device 100 senses a movement using the activated sensor (S1060). When a movement is sensed, the wearable device 100 transmits a control signal corresponding to the movement (S1070).

The user terminal device 200 adjusts a reproduction state of the content according to the control signal (S1090). Specifically, a reproducing time of the content may be adjusted, or controlling an output volume, equalizing, changing the content, pausing, stopping, reproducing, reproducing two times faster, rewinding, and fast forwarding may be performed.

The user terminal device 200 transmits a result of the adjusting to the wearable device 100 (S1100). The result of the adjusting may include the adjusted content itself, or a text and an image explaining how the reproduction state is adjusted.

The wearable device 100 outputs the result of the adjusting through the display or the speaker (S1110). For example, when equalizing is performed, GUI information indicating equalizing information may be displayed on the display and simultaneously an equalized audio signal may be output through the speaker.

The wearable device 100 continues monitoring a movement and transmitting a corresponding control signal until an end motion is input. When an end motion is sensed (S1120), the wearable device 100 transmits an end signal (S1140). Then, the wearable device 100 inactivates the sensors (S1150). In this case, at least one of the sensors may remain activated to wait to receive a program execution command, an activation command, or an initializing command.

When an end command is input through a button or a touch screen provided on the user terminal device 200 (S1130), or when an end signal is transmitted from the wearable device 100, the user terminal device 200 stores adjusted data (S1160).

On the other hand, the user may share the adjusted data with other users. That is, when a command to share the adjusted data is input (S1170), the user terminal device 200 transmits the adjusted data to the external network device 300 which is designated by the sharing command or already registered (S1190), and finishes executing the program (S1180).

The external network device 300 may be a web server or a cloud server. When there is a relevant device already registered by the user, the external network device 300 may transmit the adjusted data to the relevant device (S1200). As described above, the user may adjust the data easily and then may share the data with others through a social network.

Figure 13:
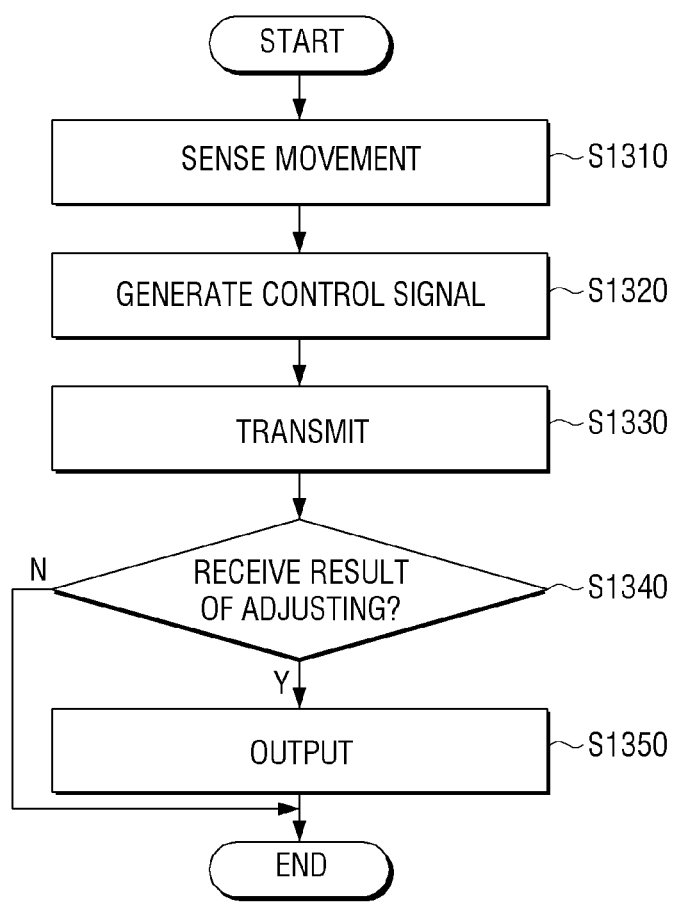
FIG. 13 is a flowchart to explain a method of a wearable device to control an external device according to an exemplary embodiment of the present general inventive concept.

FIG. 13 is a flowchart to explain a method of controlling an external device 200 by a wearable device 100 according to an exemplary embodiment of the present general inventive concept. Referring to FIG. 13, the wearable device 100 senses a movement of the wearable device 100 using the motion sensor 110 or the bending sensor 120 (S1310). The wearable device 100 generates a control signal according to a result of the sensing (S1320), and transmits the control signal to the user terminal device (S1330).

When the user terminal device adjusts data according to the control signal and transmits a result of the adjusting, the wearable device 100 receives the result of the adjusting (S1340), and outputs the result of the adjusting (S1350).

Although the above exemplary embodiments of the present general inventive concept are directed to adjusting an audio reproduction operation of an external (e.g., mobile) device, the present general inventive concept is not limited thereto. More specifically, based on a function mode selected by a user, the wearable device 100 may also be used to manipulate other functions of the external device 200, such as a global positioning service (GPS) manipulating function, a multimedia streaming function, an Internet accessing function, a SIRI voice command function, etc., but is not limited thereto. As such, predetermined motions, bending, or pressure sensed by the motion sensor 110, the bending sensor 120, and the touch sensor 190, respectively, may switch a mode from an audio reproduction operation adjusting mode to any mode that allows that above functions to be performed, such as a GPS function manipulating mode. Moreover, the wearable device 100 may be set to be in a stand-by mode immediately following a power-on, such that a mode-switching manipulation of the wearable device 100 is needed to switch from the stand-by mode to the audio reproduction mode, for example.

The GPS manipulating function may allow a user to re-route a direction that the GPS has be programmed to travel, based solely on a user pointing in a particular direction the user desires to travel when wearing the wearable device 100, during the GPS function manipulating mode. The multimedia streaming function may allow a user to manipulate a movie file during its playback using the wearable device 100 (without touching the external device 200), during a multimedia streaming mode. The Internet accessing function may allow a user to access the Internet and view various webpages using the wearable device 100 (without touching the external device 200), during an Internet accessing mode. The SIRI voice command function may be activated using the wearable device 100 (without touching the external device 200), during a SIRI voice command mode.

In further detail, the above modes may be toggled by the user via a particular mode-changing (i.e., mode-switching) gesture sensed by the wearable device 100. The present general inventive concept is not limited to the above functions and their respective modes.

The detailed operation of the wearable device 100 and operations according to other exemplary embodiments have been described above and thus a redundant explanation is omitted.

The present general inventive concept including the method of determining a movement of the wearable device, the method of controlling the external device, and the method of adjusting a content by the user terminal device, according to the above-described exemplary embodiments, can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

According to the various exemplary embodiments, a content reproduced by an external device is easily adjusted according to a movement of a user who wears a wearable device.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A wearable device that is worn on a user body, the wearable device comprising:
   a motion sensor to recognize a motion of the wearable device;
   a bending sensor to sense bending of the wearable device;
   a controller to generate a control signal according to a movement that is sensed by the motion sensor and the bending sensor;
   a communication unit to transmit the control signal to an external device, and, when an audio reproducing operation is adjusted according to the control signal in the external device, to receive a result of the adjusting from the external device; and
   a display to display the result of the adjusting.

2. The wearable device as claimed in claim 1, wherein the wearable device is a device of a glove shape that comprises a plurality of finger parts,
   wherein the bending sensor is disposed in each of the plurality of finger parts and senses bending of each finger part,
   wherein the result of the adjusting comprises at least one of equalizing data that is generated according to an equalizing operation performed in the external device according to the control signal, audio data information that is reproduced in the external device, an audio output volume, and an audio reproducing time.

3. The wearable device as claimed in claim 2, wherein, when an audio reproducing program is executed in the external device, the controller activates the motion sensor and the bending sensor.

4. The wearable device as claimed in claim 2, further comprising a storage to store a plurality of control codes,
   wherein the controller detects a control code corresponding to a sensing value sensed by the motion sensor and the bending sensor from the storage, and generates a control signal including the detected control code.

5. The wearable device as claimed in claim 2, further comprising a speaker to output an audio signal that is transmitted from the external device.

6. The wearable device as claimed in claim 2, wherein, when it is determined that a predetermined end motion is generated, the controller generates an end signal to finish adjusting audio data according to the control signal and to store the adjusted data, and transmits the end signal to the external device.

7. The wearable device as claimed in claim 2, comprising:
   a body formed in the glove shape and which is made of flexible material, and supports the motion sensor, the bending sensor, the controller, the communication unit, and the display; and
   a power supply embedded in the body and which is made of flexible material, and supplies power to the motion sensor, the bending sensor, the controller, the communication unit, and the display,
   wherein the display is disposed on an outer surface of a back of a hand in the body.

8. The wearable device as claimed in claim 7, wherein the body comprises a pair of a left-hand glove and a right-hand glove,
   wherein the motion sensor, the bending sensor, the controller, the communication unit, and the display are disposed in each of the left-hand glove and the right-hand glove,
   wherein the controller disposed in the left-hand glove adjusts an audio reproducing time of the external device according to a movement of the left-hand glove, and the controller disposed in the right-hand glove controls an equalizing operation of the external device according to a movement of the right-hand glove.

9. A method of controlling an external device of a wearable device that is worn on a body of a user, the method comprising:
   outputting, by a motion sensor and a bending sensor mounted in the wearable device, a sensing value according to a user's movement;
   generating a control signal according to the sensing value;
   transmitting the control signal to the external device, and, when an audio reproducing operation is adjusted according to the control signal by the external device, receiving a result of the adjusting from the external device; and displaying the result of the adjusting.

10. The method as claimed in claim 9, wherein the wearable device is a device of a glove shape that comprises a plurality of finger parts,
wherein the bending sensor is disposed in each of the plurality of finger parts and senses bending of each finger part,
wherein the result of the adjusting comprises at least one of equalizing data that is generated according to an equalizing operation performed in the external device according to the control signal, audio data information that is reproduced in the external device, an audio output volume, and an audio reproducing time.

11. The method as claimed in claim 10, further comprising, when an audio reproducing program is executed in the external device, activating the motion sensor and the bending sensor.

12. The method as claimed in claim 10, wherein the generating the control signal comprises:
detecting a control code corresponding to a sensing value sensed by the motion sensor and the bending sensor from among pre-stored control codes; and
generating a control signal including the detected control code.

13. The method as claimed in claim 10, further comprising outputting an audio signal that is transmitted from the external device through a speaker that is attached to the wearable device.

14. The method as claimed in claim 10, further comprising, when it is determined that a predetermined end motion is generated, generating an end signal to finish adjusting audio data according to the control signal and to store the adjusted data, and transmitting the end signal to the external device.

15. The method as claimed in claim 10, wherein the wearable device comprises a pair of a left-hand glove and a right-hand glove,
wherein the generating the control signal comprises:
generating a first control signal to adjust an audio reproducing time of the external device according to a movement of the left-hand glove; and
generating a second control signal to control an equalizing operation of the external device according to a movement of the right-hand glove.

16. A wearable device to be worn by a user and to communicate with an external device, the wearable device comprising:
at least one sensor to sense a mode-switching manipulation of the wearable device while in a first operating mode during which a plurality of operations are executable in response to a first series of corresponding manipulations of the wearable device; and
a communication unit to transmit the sensed mode-switching manipulation to the external device via a control signal in order to switch from the first operating mode to a second operating mode during which another plurality of operations are executable based on a second series of corresponding manipulations of the wearable device.

17. The wearable device of claim 16, wherein the mode-switching manipulation comprises at least one of moving the wearable device, bending the wearable device, and applying pressure to the wearable device.

18. The wearable device of claim 16, wherein the first series of corresponding manipulations of the wearable device is the same as the second series of corresponding manipulations of the wearable device.

19. The wearable device of claim 16, wherein the at least one sensor comprises at least one of a motion sensor to sense a movement of the wearable device, a bending sensor to sense bending of the wearable device, and a touch sensor to sense a touch pressure of the wearable device that is transferred to an object.

* * * * *